(12) United States Patent
Gschwind et al.

(10) Patent No.: US 8,255,669 B2
(45) Date of Patent: *Aug. 28, 2012

(54) METHOD AND APPARATUS FOR THREAD PRIORITY CONTROL IN A MULTI-THREADED PROCESSOR BASED UPON BRANCH ISSUE INFORMATION INCLUDING BRANCH CONFIDENCE INFORMATION

(75) Inventors: Michael Karl Gschwind, Chappaqua, NY (US); Robert Alan Philhower, Valley Cottage, NY (US); Raymond Cheung Yeung, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 293 days.

This patent is subject to a terminal disclaimer.

(21) Appl. No.: 12/023,004

(22) Filed: Jan. 30, 2008

(65) Prior Publication Data

US 2009/0193231 A1    Jul. 30, 2009

(51) Int. Cl.
G06F 9/32    (2006.01)
(52) U.S. Cl. ........................................ 712/205; 712/239
(58) Field of Classification Search .................. None
See application file for complete search history.

(56) References Cited

U.S. PATENT DOCUMENTS

| | | | |
|---|---|---|---|
| 6,272,666 B1 | 8/2001 | Borkar et al. | |
| 6,363,490 B1 | 3/2002 | Senyk | |
| 6,393,374 B1 | 5/2002 | Rankin et al. | |
| 6,411,156 B1 | 6/2002 | Borkar et al. | |
| 6,415,388 B1 | 7/2002 | Browning et al. | |
| 6,484,265 B2 | 11/2002 | Borkar et al. | |
| 6,564,328 B1 | 5/2003 | Grochowski et al. | |
| 6,608,528 B2 | 8/2003 | Tam et al. | |
| 6,625,744 B1 * | 9/2003 | Rappoport et al. | 714/2 |
| 6,697,932 B1 * | 2/2004 | Yoaz et al. | 712/216 |
| 6,762,629 B2 | 7/2004 | Tam et al. | |
| 6,788,156 B2 | 9/2004 | Tam et al. | |
| 6,908,227 B2 | 6/2005 | Rusu et al. | |
| 6,931,559 B2 | 8/2005 | Burns et al. | |

(Continued)

FOREIGN PATENT DOCUMENTS

WO    PCT/US99/24194    5/2000

OTHER PUBLICATIONS

Grunwald et al. (Confidence Estimation for Speculation Control); ACM SIGARCH Computer Architecture News; vol. 26, Issue 3 (Jun. 1998); pp. 122-131.*

(Continued)

*Primary Examiner* — Keith Vicary
(74) *Attorney, Agent, or Firm* — Matt Talpis; Mark P Kahler (57) ABSTRACT

An information handling system employs a processor that includes a thread priority controller. An issue unit in the processor sends branch issue information to the thread priority controller when a branch instruction of an instruction thread issues. In one embodiment, if the branch issue information indicates low confidence in a branch prediction for the branch instruction, the thread priority controller speculatively increases or boosts the priority of the instruction thread containing this low confidence branch instruction. In the manner, should a branch redirect actually occur due to a mispredict, a fetcher is ready to access a redirect address in a memory array sooner than would otherwise be possible.

9 Claims, 7 Drawing Sheets

U.S. PATENT DOCUMENTS

| | | | |
|---|---|---|---|
| 7,035,997 B1 * | 4/2006 | Musoll et al. | 712/205 |
| 7,627,742 B2 | 12/2009 | Bose | |
| 2002/0099926 A1 * | 7/2002 | Sinharoy | 712/207 |
| 2003/0117759 A1 | 6/2003 | Cooper | |
| 2003/0126478 A1 | 7/2003 | Burns et al. | |
| 2003/0126479 A1 | 7/2003 | Burns et al. | |
| 2003/0188211 A1 | 10/2003 | Chen | |
| 2003/0204762 A1 | 10/2003 | Lee et al. | |
| 2004/0003215 A1 | 1/2004 | Krimer | |
| 2004/0071184 A1 | 4/2004 | Naveh et al. | |
| 2004/0148528 A1 | 7/2004 | Silvester et al. | |
| 2004/0158771 A1 | 8/2004 | Garnett et al. | |
| 2005/0044434 A1 | 2/2005 | Kahle et al. | |
| 2005/0102544 A1 | 5/2005 | Brewer et al. | |
| 2005/0138438 A1 | 6/2005 | Bodas | |
| 2005/0166075 A1 | 7/2005 | Hack | |
| 2005/0235170 A1 * | 10/2005 | Atkinson | 713/320 |
| 2005/0283624 A1 | 12/2005 | Kumar et al. | |
| 2006/0020831 A1 | 1/2006 | Golla et al. | |
| 2006/0101238 A1 * | 5/2006 | Bose et al. | 712/206 |
| 2008/0263325 A1 * | 10/2008 | Kudva et al. | 712/203 |

OTHER PUBLICATIONS

Tullsen et al. (Exploiting Choice: Instruction Fetch and Issue on an Implementable Simultaneous Multithreading Processor); Proceedings of the 23rd annual international symposium on Computer architecture; pp. 191-202; Year of Publication: 1996.*

Falcon et al. (A Low-Complexity, High-Performance Fetch Unit for Simultaneous Multithreading Processors); Proceedings of the 10th International Symposium on High Performance Computer Architecture; 2004; 10 pages.*

Jacobsen et al. (Assigning Confidence to Conditional Branch Predictions); Proceedings of the 29th annual ACM/IEEE international symposium on Microarchitecture; pp. 142-152; Year of Publication: 1996.*

Swanson et al. (An Evaluation of Speculative Instruction Execution on Simultaneous Multithreaded Processors); ACM Transactions on Computer Systems (TOCS); vol. 21 , Issue 3 (Aug. 2003); pp. 314-340.*

Crepps—Improving Multi-Core Architecture Power Efficiency Through EPI Throttling and Asymmetric Multiprocessing, Technology @ Intel Magazine (Feb. 2006).

Felter—A Performance-Conserving Approach for Reducing Peak Power Consumption in Server Systems, ICS'05 (Jun. 2005).

Hofstee—Power Efficient Processor Architecture and The Cell Processor, IEEE HPCA (Nov. 2005).

Intel-1—VRM 9.0 DC-DC Converter Design Guidelines, Intel (Apr. 2002).

Intel-2—Embedded Voltage Regulator-Down (EmVRD) 11.0, Intel Design Guidelines (Aug. 2006).

Li—Deterministic Clock Gating for Microprocessor Power Reduction, HPCA (Sep. 2003).

Sinharoy—Powers System Architecture, IBM JRD (Jul./Sep. 2005).

Tullsen—Simultaneous Multithreading: Maximimizing On-Chip Parallelism, Proc. $22^{nd}$ AISCA, Italy, (Jun. 1995).

US 6,330,680, 12/2001, Browning et al. (withdrawn)

* cited by examiner

METHOD AND APPARATUS FOR THREAD PRIORITY CONTROL IN A MULTI-THREADED PROCESSOR BASED UPON BRANCH ISSUE INFORMATION INCLUDING BRANCH CONFIDENCE INFORMATION

TECHNICAL FIELD OF THE INVENTION

The disclosures herein relate generally to processors, and more particularly, to multi-threading processors in information handling systems.

BACKGROUND

Early processors included a single core that employed relatively low clock speeds to process an instruction stream. More recent processors still employed a single core to process a single instruction stream, but increased performance by employing techniques such as branch prediction, out-of-order execution as well as first and second level on-chip memory caching. Processors with increased clock speed experienced improved performance, but encountered undesirable power dissipation problems that ultimately limited clock speed. Moreover, increased clock speed may actually result in lower execution unit utilization because of increases in the number of clock cycles required for instruction execution, branch misprediction, cache misses and memory access.

Multi-threading provides a way to increase execution unit utilization by providing thread-level parallelism that improves the throughput of the processor. A thread is an instruction sequence that can execute independently of other threads. One thread may share data with other threads. Multi-threading processors typically include a thread priority circuit that determines which particular thread of multiple threads the processor should process at any particular point in time. Multi-core processors may use multi-threading to increase performance.

What is needed is an apparatus and methodology that improves thread selection in a multi-threaded processor of an information handling system.

SUMMARY

Accordingly, in one embodiment, a method is disclosed for operating a processor. The method includes storing, by a memory array, a plurality of instruction threads. The method also includes fetching, by a fetcher, a particular instruction thread from the memory array, the particular instruction thread including a particular branch instruction. In this embodiment, the fetcher communicates with a thread priority controller. The method still further includes predicting, by a branch predictor, an outcome of the particular branch instruction of the particular instruction thread, thus providing a branch prediction. The method also includes issuing, by an issue unit, the particular branch instruction of the particular instruction thread to a branch execution unit for execution. The method further includes sending, by the issue unit, branch issue information to the thread priority controller. The method still further includes changing, by the thread priority controller, a priority of the particular instruction thread in response to the branch issue information.

In another embodiment, a processor is disclosed that includes a memory array that stores instruction threads that include branch instructions. The processor also includes a fetcher, coupled to the memory array, that fetches a particular instruction thread including a particular branch instruction from the memory array. The processor further includes a branch predictor that predicts an outcome of the particular branch instruction, thus providing a branch prediction for the particular branch instruction. The processor still further includes an issue unit, coupled to the memory array and a branch execution unit, that issues the particular branch instruction of the particular thread to the branch execution unit for execution, wherein the issue unit provides branch issue information related to the particular branch instruction. The processor also includes a thread priority controller, coupled to the issue unit and the memory array, to receive the branch issue information from the issue unit, wherein the thread priority controller changes a priority of the particular instruction thread in response to the branch issue information relating to the particular branch instruction.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Figure 1:
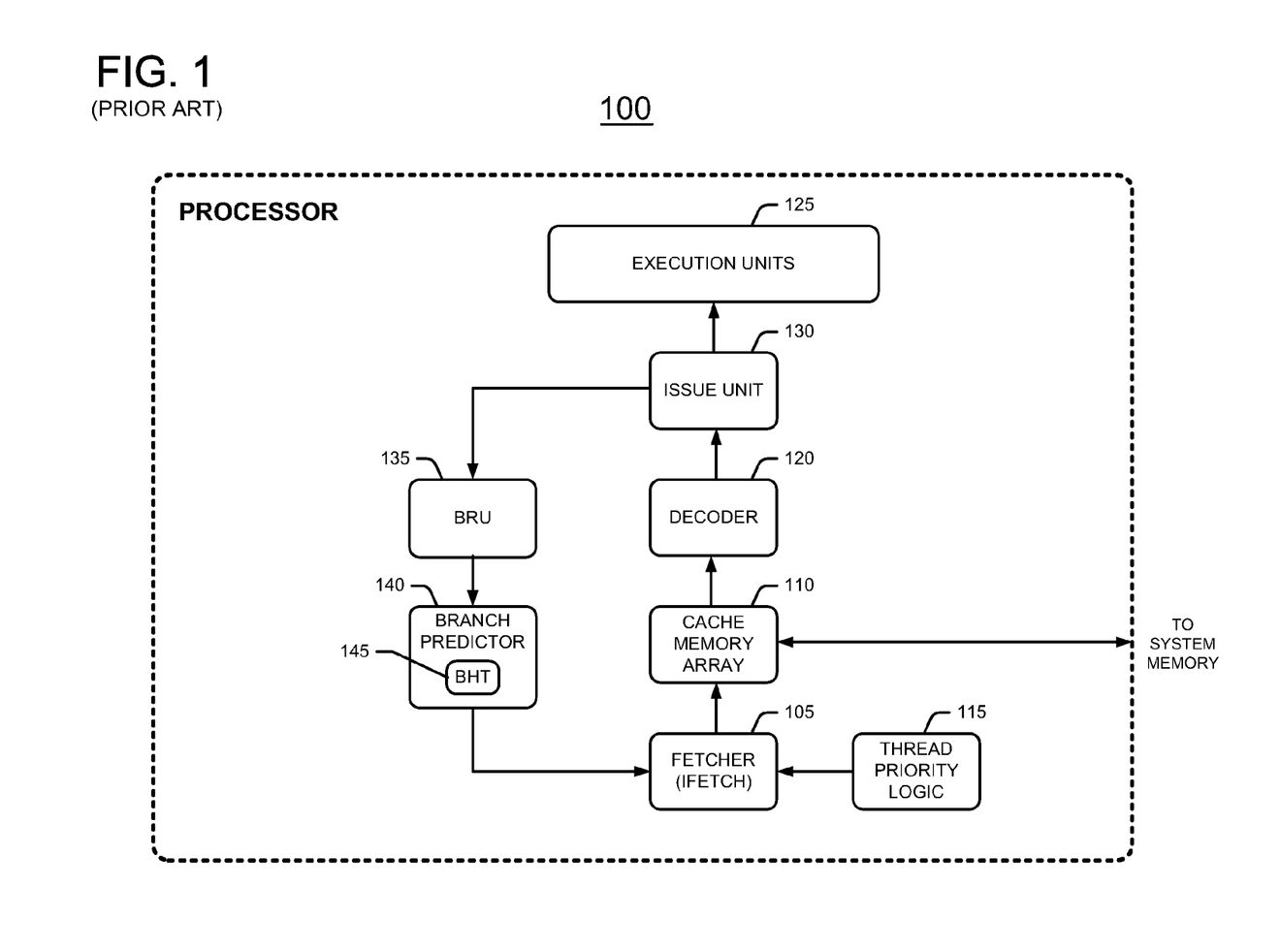
FIG. 1 shows a block diagram of a conventional multi-thread processor that employs a thread priority controller.

FIG. 1 shows a conventional multi-threaded processor 100 including a fetcher 105 that fetches instructions from an instruction source such as a cache memory array 110. A thread priority logic circuit 115 couples to fetcher 105 to instruct fetcher 105 which particular thread to fetch from cache memory array 110. Memory array 110 couples to a system memory (not shown) that is external to processor 100. A decoder 120 receives groups of fetched instructions corresponding to threads from the instruction stream that fetcher 105 and memory array 110 provide. This instruction stream includes instruction threads that execution units 125 will execute. Decoder 120 decodes the fetched instructions and provides decoded instructions corresponding to the threads to issue unit 130 for issue to execution units. Issue unit 130 issues the instructions of the threads to appropriate execution units 125 for execution.

Processor 100 uses speculative execution methodology with branch prediction to increase the instruction handling efficiency of the processor. Fetcher 105 fetches a stream of instructions that contains branch instructions. Processor 100 may speculatively execute instructions after a branch instruction in response to a branch prediction. Speculatively executing instructions after a branch typically involves accessing cache memory array 110 to obtain the instructions following the branch. In more detail, after decoder 120 decodes a fetched branch instruction of the instruction stream, a branch prediction circuit 140 makes a prediction whether or not to take the branch that the branch instruction offers. The branch is either "taken" or "not taken". Branch prediction circuit 140 predicts whether or not to take the branch by using branch history information, namely the branch results when the processor encountered this particular branch instruction in the past. Branch history table (BHT) 145 stores this branch history information. If branch prediction circuit 140 predicts the branch correctly, then processor 100 keeps the results of the speculatively executed instructions after the branch. However, if the branch prediction is incorrect, then processor 100 discards or flushes the results of instructions after the branch. Processor 100 then starts executing instructions at a redirect address that corresponds to the correct target address of the branch instruction after branch resolution. The speculative execution of instructions by processor 100 may consume a significant amount of power.

One approach to conserving power in a processor is by throttling the fetching of instructions when the processor encounters a group of branch instructions that the processor determines to cumulatively exhibit low confidence with respect to branch prediction. To achieve this, a processor may include a branch instruction queue (BIQ) that stores the group of branch instructions from the instruction stream along with confidence information for each stored branch instruction. The BIQ stores those branches of the instruction stream that are "in-flight", namely those instructions that the processor did not yet resolve. If the number of low confidence branches in the BIQ is greater than a predetermined confidence threshold, then the processor performs instruction fetch throttling to reduce power consumption under these low branch prediction confidence conditions. Such a fetch throttling power conservation method is disclosed in the commonly assigned U.S. patent application Ser. No. 11/733,589, filed Apr. 10, 2007, entitled "Method and Apparatus for Conserving Power by Throttling Instruction Fetching When a Processor Encounters Low Confidence Branches in an Information Handling System", by Bose et al, the disclosure of which is incorporated herein by reference in its entirety.

Figure 2:
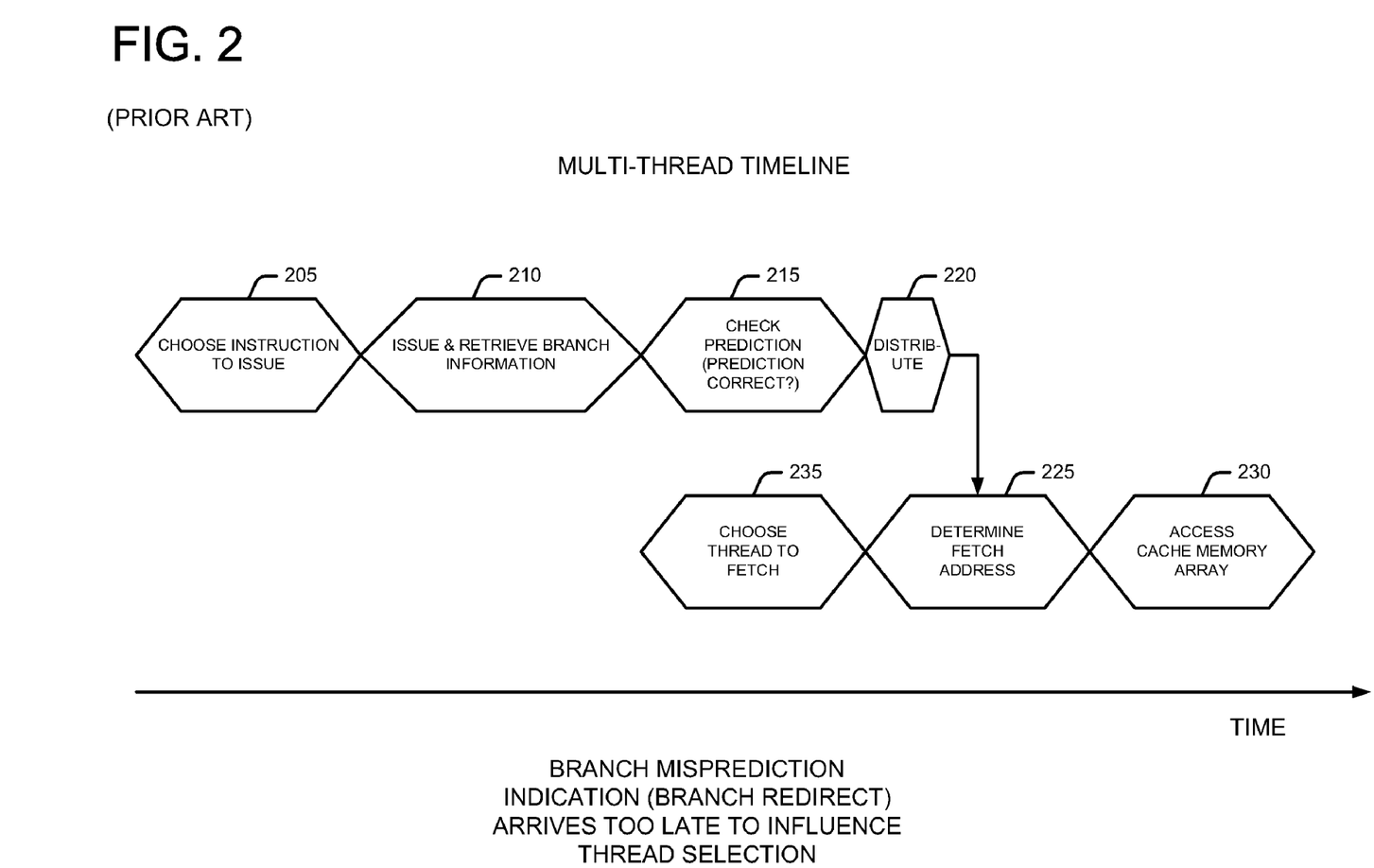
FIG. 2 shows a typical multi-thread timeline for the conventional multi-thread processor of FIG. 1.

FIG. 2 shows a typical multi-threaded timeline for the conventional multi-threaded processor 100 of FIG. 1. Issue unit 130 in the multi-threaded processor 100 selects an instruction to issue during time block 205. Issue unit 130 issues the selected instruction and retrieves branch information during time block 210. If the issued instruction is a branch instruction, then branch unit (BRU) 135 checks branch prediction information to see if the prediction was correct during time block 215. If the branch instruction is a mispredicted branch, then branch unit 135 distributes notice of the branch misprediction to fetcher 105 during distribute time block 220. Distribute time block 220 reflects the wire delay in BRU 135 notifying fetcher 105 about a branch misprediction. During time block 225, fetcher 105 determines the next address to fetch. This fetch address may correspond to the redirect address if thread priority logic 115 selects the thread corresponding to the branch misprediction. However, if thread priority logic 115 does not select the thread corresponding to the branch misprediction, then processor 100 stores the redirect address in a register for later processing, possibly after a substantial delay. Fetcher 105 then accesses memory array 110 at the determined fetch address during time block 230. In the conventional multi-thread timeline of FIG. 2, thread priority logic 115 actually chooses the next thread to fetch during time block 235 which coincides with check branch prediction time block 215. Thus unfortunately, in the event that a branch misprediction occurs, the branch misprediction information from distribute time block 220 arrives at fetcher 105 during determine fetch address time block 225. This time is too late to affect the thread fetch decision that already occurred during "choose thread to fetch" time block 235. Thus, it is frequently possible for the branch redirect address arriving during time block 225 to be unable to affect the fetch and fetch instructions from the redirect address. This results in potentially significant performance degradation for the corresponding thread and overall reduced aggregate utilization of processor 100.

Figure 3:
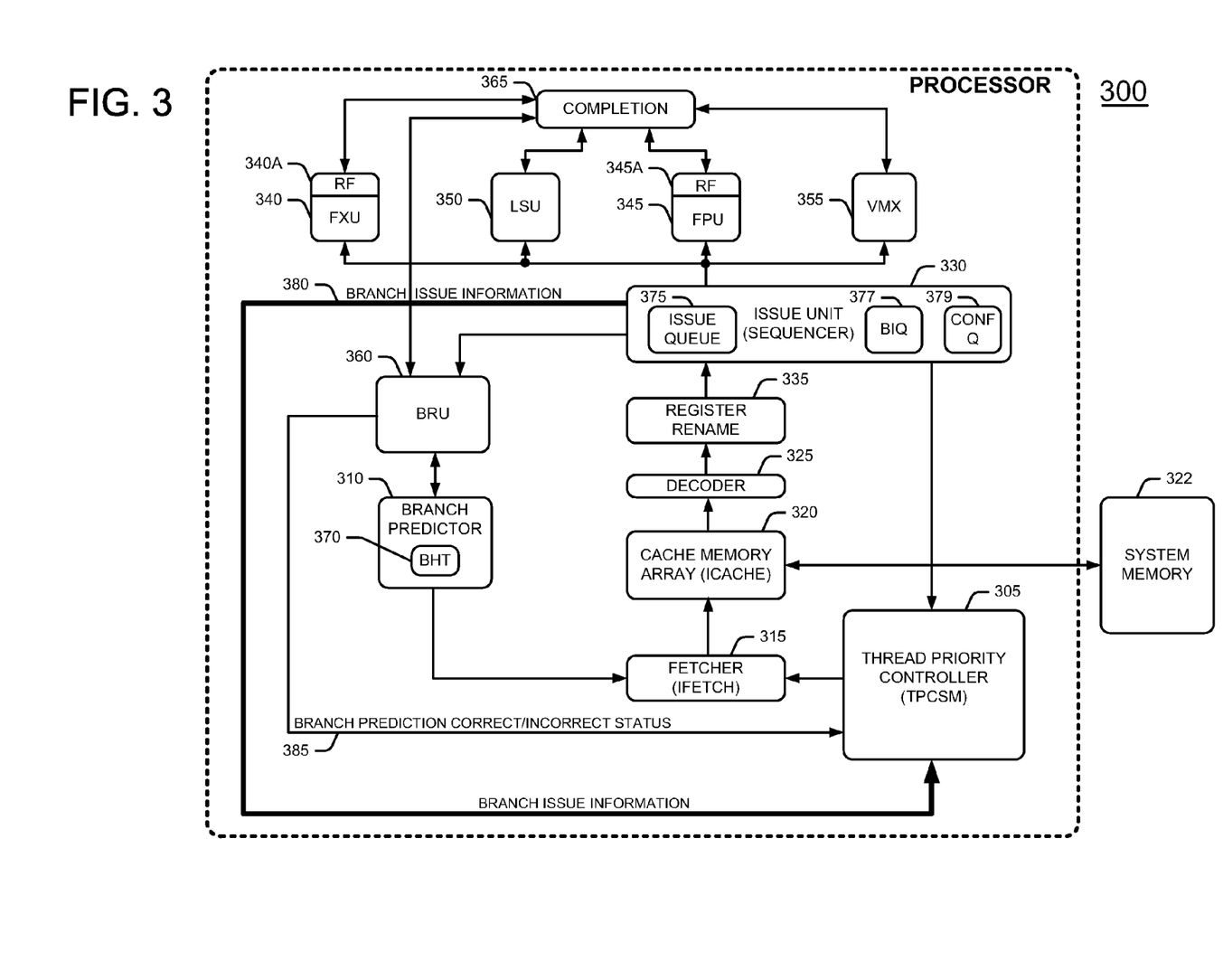
FIG. 3 shows a block diagram of the disclosed processor including a thread priority controller that receives branch issue information.

FIG. 3 is a block diagram of the disclosed multi-threaded processor 300, one embodiment of which includes a thread priority controller such as thread priority controller state machine (TPCSM) 305. TPCSM 305 may increase processor performance by speculatively increasing the priority of a particular thread that includes a low confidence branch instruction for which a branch redirect operation is likely. In this manner, processor 300 is ready to conduct a fetch operation at a redirect address in memory should a branch mispredict actually occur. An example of a branch instruction for which a redirect operation is likely is a branch instruction for which processor 300 has low confidence in the branch prediction by branch predictor circuit 310.

In one embodiment, processor 300 is a simultaneous multi-threaded (SMT) processor that includes multiple pipeline stages. For example, processor 300 includes a fetcher 315 that couples to TPCSM 305. TPCSM 305 determines the fetch priority of instruction threads that fetcher 315 fetches from cache memory array 320. Cache memory array 320 couples to an external system memory 322. Memory array 320 couples to a decoder 325 that decodes instructions in the fetched instruction threads that decoder 325 receives from memory array 320. Decoder 325 couples to an issue unit or sequencer 330 via register renaming circuit 335 to provide issue unit 330 with an instruction stream for execution. Register renaming circuit 335 effectively provides additional registers to enhance the execution of fetched instructions. Issue unit 330 sends ready decoded instructions to appropriate functional units for execution. Ready instructions are those instructions with no outstanding or unsatisfied dependencies. Processor 300 includes the following functional units: an integer or fixed point execution unit (FXU) 340, a floating-point execution unit (FPU) 345, a load/store execution unit (LSU) 350, a vector media extension execution unit (VMX) 355 and a branch execution unit (BRU) 360. FXU 340 and FPU 345 include register files (RFs) 340A and 345A, respectively, for storing computational results.

Branch execution unit (BRU) 360 couples to issue unit 330 to execute branch instructions that it receives from issue unit 330. BRU 360 couples to both branch predictor 310 and completion unit 365. The execution units FXU 340, LSU 350, FPU 345, VMX 355 and BRU 360 speculatively execute instructions in the instruction stream after a decoded branch instruction. Branch predictor 310 includes a branch history table (BHT) 370. Branch history table (BHT) 370 tracks the historical outcome of previously executed branch instructions. Branch unit (BRU) 360 checks branch predictions previously made by branch predictor 310 in response to instruction fetcher requests, and updates this historical branch execution information to reflect the outcome of branch instructions that it currently receives.

Completion unit 365 couples to each of the execution units, namely FXU 340, FPU 345, LSU 350, VMX 355 and BRU 360. More specifically, completion unit 365 couples to FXU register file 340A and FPU register file 345A. Completion unit 365 determines whether or not speculatively executed instructions should complete. If the branch predictor 310 correctly predicts a branch, then the instructions following the branch should complete. For example, if branch predictor 310 correctly predicts a branch, then a fixed point or integer instruction following that branch should complete. If the instruction following the correctly predicted branch is a fixed point instruction, then completion unit 365 controls the write back of the fixed point result of the branch to fixed point register file 340A. If the instruction following the correctly predicted branch is a floating point instruction, then completion unit 365 controls the write back of the result of that floating point instruction to floating point register file 345A. When instructions complete, they are no longer speculative. The branch execution unit (BRU) 360 operates in cooperation with completion unit 365 and BHT 370 to resolve whether or not a particular branch instruction is taken or not taken.

To facilitate the speculative execution of instructions, issue unit 330 includes an issue queue 375 that permits out-of-order execution of ready instructions. Ready instructions are those instructions for which all operands are present and that exhibit no outstanding or unsatisfied dependencies. Issue queue 375 stores instructions of threads awaiting issue by issue unit 330. In one embodiment, issue unit 330 includes a branch instruction queue (BIQ) 377 that stores branch instructions from the instruction stream of instruction threads that issue unit 330 receives. In one embodiment, issue unit 330 also includes a confidence queue (CONF Q) 379. For each particular branch instruction in BIQ 377, confidence queue 379 stores respective confidence information that indicates the level of confidence in the prediction of the particular branch that branch predictor 310 provides.

In one embodiment, the designer or other entity bases the confidence in a branch prediction on a confidence value derived at branch instruction prediction time and corresponding to the value that the confidence queue 379 stores for that branch instruction. In another embodiment, confidence queue 379 or other confidence storage apparatus obtains this confidence information from other instruction characteristics, such as the nature of a specific branch. For example, indirect branches or PC-relative condition forward branches are usable to infer low confidence. In contrast, unconditional branch instructions, return from subroutine-branch instructions (e.g. the branch to link register (blr) instruction in the Power Architecture™), and backward PC-relative conditional branch instructions are usable to infer high confidence. In yet another embodiment, low confidence may be inferred from the presence of any conditional or register-indirect branch instruction. In yet another embodiment, low confidence may be inferred for any branch instruction being issued, without further analysis as to its nature. Those skilled in the art will be able to practice the teachings contained herein with yet other methods of determining branch confidence.

BIQ 377 may include both valid and invalid branch instructions. The invalid branch instructions are those speculatively executed branch instructions that completion unit 365 resolved previously but which still remain in BIQ 377. The remaining valid branch instructions in BIQ 377 are those branch instructions still "in flight", namely those speculatively executed branch instructions that completion unit 365 did not yet resolve. Processor 300 further includes a branch prediction correct/incorrect status line 385 over which BRU 360 informs thread priority controller state machine (TPCSM) 305 with respect to the correct or incorrect prediction status of each branch instruction after branch resolution. In an alternative embodiment, thread priority controller state machine (TPCSM) 305 may include BIQ 377 and confidence queue 379 instead of issue unit 330. In that embodiment, TPCSM 305 obtains confidence information for each branch instruction from the confidence queue in TPCSM 305 rather than looking to issue unit 330 for this information.

Thread priority controller state machine (TPCSM) 305 controls the priority of each thread that fetcher 315 fetches from memory array 320. For each branch instruction that issue unit 330 issues to an appropriate execution unit, issue unit 330 also sends branch issue information to TPCSM 305 via branch issue information bus 380. This branch issue information includes timing information that notifies TPCSM 305 when each particular branch instruction issues. The branch issue information may also include a thread ID that associates with the respective particular branch instruction. In one embodiment, the branch issue information includes confidence information that indicates the amount of confidence that branch predictor 310 has in the branch prediction for a particular branch instruction. TPCSM 305 thus receives branch prediction confidence information from confidence queue 379 for the branch instructions that BIQ 377 stores. To summarize, in one embodiment, issue unit 330 sends branch issue information to TPCSM 305 for each branch instruction that issue unit 330 issues. That branch issue information may include 1) timing information that signals when issue unit 330 issued a particular branch instruction 2) the thread ID of the thread in which the particular branch instruction resides, and 3) confidence information in the prediction for the outcome of the particular branch instruction.

TPCSM 305 examines the confidence information that it receives for a respective branch instruction of an instruction thread. TPCSM 305 performs a test to determine if the confidence in the prediction for a particular branch instruction is greater than a predetermined confidence threshold level. A designer or other entity selects the predetermined confidence threshold level such that if the confidence in the branch prediction of a particular branch instruction exceeds this predetermined confidence threshold level, this indicates high confidence for which a branch redirect is unlikely. In such an event, TPSCM 305 leaves the priority of the thread including the particular branch instruction unaltered from what it would normally be without consideration of the confidence information.

However, if the test by TPSCM 305 examines the confidence information and determines that the confidence in the branch prediction of the particular branch instruction does not exceed a predetermined confidence threshold level, then a branch redirect is likely. In other words, the particular branch instruction exhibits low confidence. In response to this low confidence condition, TPSCM 305 speculatively increases the priority of the thread containing this particular branch instruction. TPSCM 305 instructs fetcher 315 to schedule the thread containing the branch instruction that exhibits low confidence for access to the instruction cache 320 by increasing its thread priority. In this manner, should a redirect ultimately occur, fetcher 315 is better prepared to handle the redirect by fetching the redirect address instruction earlier than would otherwise be possible. In this manner, TPCSM 305 provides a speculative thread priority boost for a thread that includes a particular branch instruction for which confidence is low and a branch redirect is likely.

Figure 4:
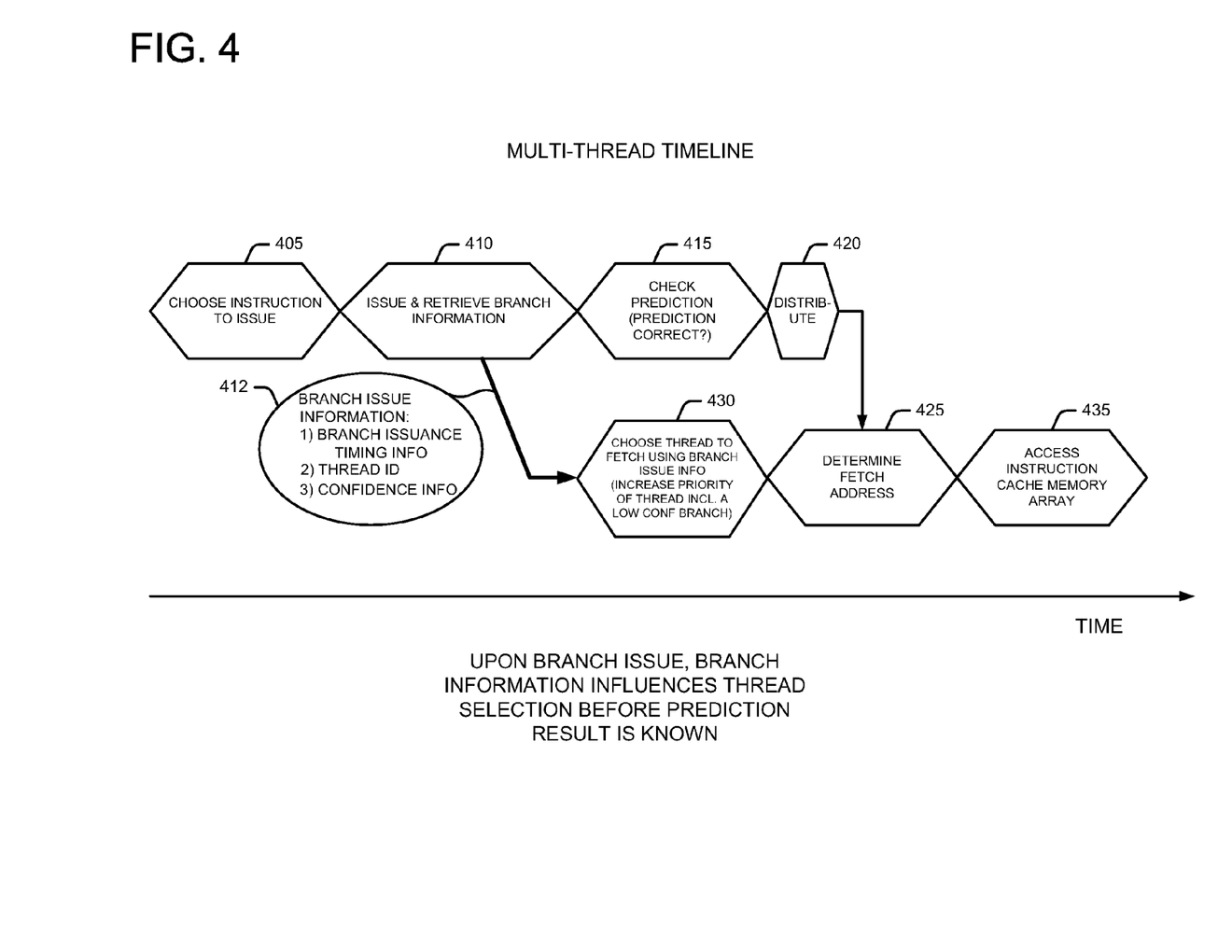
FIG. 4 is a representative timeline for the disclosed processor of FIG. 3.

FIG. 4 shows a representative timeline for multi-threaded processor 300 of FIG. 3. Issue unit 330 selects or chooses a particular branch instruction to issue during time block 405. Issue unit 330 then issues the particular branch instruction during time block 410. Issue unit 330 also retrieves branch information during time block 410. During time block 410, issue unit 330 sends branch issue information 412 to thread priority controller state machine (TPCSM) 305. Branch issue information 412 may include 1) timing information that indicates when issue unit 330 issued the particular branch instruction, 2) the thread ID of the thread in which the particular branch instruction resides, and 3) confidence information for the branch prediction of the particular branch instruction. TPCSM 305 will use this branch issue information to speculatively increase the priority of the thread including the branch instruction under certain circumstances. More specifically, TPCSM 305 will use this branch issue information to increase the fetch priority of the thread containing the branch instruction if the branch prediction for that branch instruction exhibits low confidence such that a branch redirect is likely. In this manner, fetcher 315 is ready to access memory array 320 to service a branch redirect should a branch redirect actually occur.

Returning to the timeline of FIG. 4, after issuing the particular branch instruction during time block 410 to BRU 360 for speculative execution, BRU 360 executes that branch instruction. During time block 415, BRU 360 checks the prediction for the particular branch instruction to determine if the branch prediction was correct. During distribute time block 420, BRU 360/branch predictor 310 distributes branch prediction correct/incorrect status information to fetcher 315 via branch prediction status line 385.

If branch predictor 310 correctly predicted the outcome of the branch instruction, then fetcher 315 continues executing instructions following the branch instruction. To perform this task, fetcher 315 determines the fetch address of the next instruction during time block 425. After determining the fetch address, fetcher 315 accesses cache memory array 320 during time block 435.

However, if branch predictor 310 incorrectly predicted the outcome of the branch instruction, then a different scenario occurs. As noted above, during time block 410, issue unit 330 sends branch issue information 412 to thread priority controller state machine (TPCSM) 305. TPCSM 305 uses this branch issue information to choose the next thread to fetch during time block 430. For example, TPCSM 305 checks the branch issue information and determines if the branch prediction confidence information therein indicates more than a predetermined amount of confidence in the prediction for that branch. If the confidence information does not indicate more confidence than a predetermined amount of confidence threshold level, then a branch misprediction is likely for this particular branch instruction of a thread. TPCSM 305 then determines the next thread to fetch using the branch information during time block 430.

In the case of such low confidence in a particular branch's prediction, i.e. a branch prediction confidence not exceeding the predetermined confidence threshold level, TPCSM 305 speculatively assumes a branch misprediction and a consequent branch redirect. In response to this condition, during time block 430 TPCSM 305 increases the priority of the thread including the particular branch instruction so that, in the event that during distribute time block 420 BRU 360 reports an actual branch mispredict, then during time block 425 fetcher 315 is ready to determine the proper fetch address of the thread that now exhibits increased priority. In the event of such a mispredict, fetcher 315 is now ready earlier than would otherwise be possible to access cache memory array 320 to obtain instructions from the appropriate thread. Speculatively increasing the priority of a thread that includes a branch instruction with low confidence of prediction decreases cache latency in this branch redirect scenario.

If the particular branch instruction of a thread exhibits more branch prediction confidence that the predetermined confidence threshold level, such that a redirect is unlikely, then TPCSM 305 does not increase or alter the priority of the thread containing the particular branch instruction. Thus, fetcher 315 determines the next fetch address without an increase in the priority of the thread containing the likely properly predicted branch instruction. This is the scenario wherein a particular branch instruction exhibits high confidence of prediction, i.e. more confidence than the predetermined confidence threshold level.

A number of alternative methods are available to assess branch prediction confidence. For example, one alternative method may use branch type to infer branch prediction confidence. In this approach, one or more of an unconditional branch, a return from subroutine branch (blr in the Power Architecture™) and a conditional relative branch with a negative offset, typically indicate a loop-closing branch that is usable to infer that a branch exhibits high confidence. In contrast, one or more of a general indirect branch (e.g., branch to count register in the Power Architecture™) and a conditional relative branch forward, typically indicate the evaluation of a conditional statement that is usable to infer that a branch exhibits low confidence. Yet another method may employ a tournament predictor to infer high branch confidence when multiple branch predictor components agree (an "agree condition"). The tournament predictor may infer low confidence when multiple components disagree (a "disagree condition") or when the tournament predictor has weak confidence in selecting a specific tournament predictor component. These branch prediction confidence methods do not necessarily need to employ a confidence queue to store confidence information. Other structures for storing confidence information are acceptable depending on the particular application.

Figure 5:
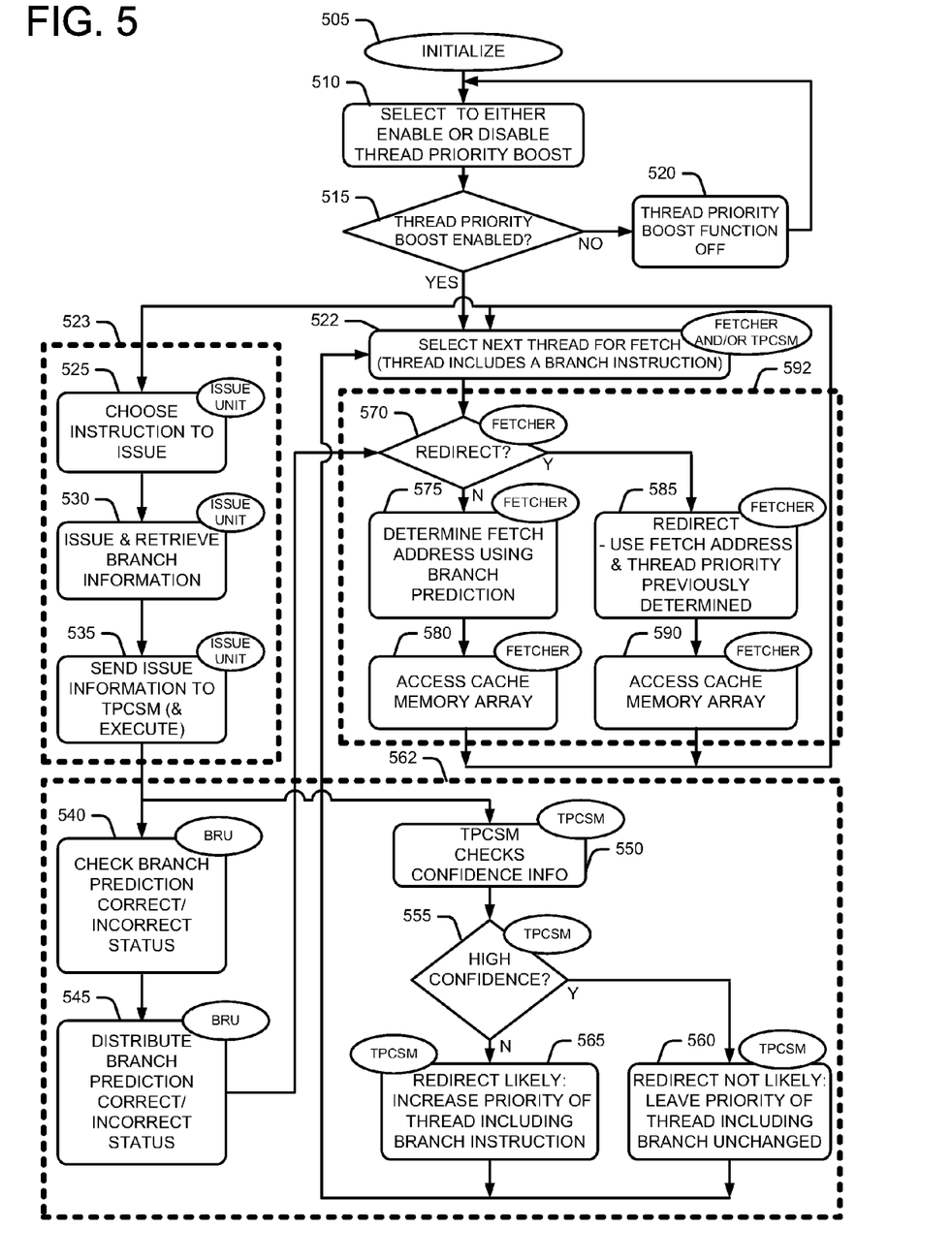
FIG. 5 is a flowchart that depicts one embodiment of the methodology that the processor of FIG. 3 employs.

FIG. 5 is a flowchart that depicts one embodiment of the methodology that processor 300 employs to process threads including branch instructions. Process flow commences when processor 300 initializes in block 505. A user or other entity may enable or disable the boost function of TPCSM 305 that increases thread priority for a thread that includes a low confidence branch instruction, as per block 510. TPCSM 305 checks to see if the thread priority boost function exhibits the enabled state, as per decision block 515. If the thread priority boost function does not exhibit the enabled state, then TPCSM 305 turns the thread priority boost function off, as per block 520. In this event, decision block 515 continues testing to determine if the thread priority boost function becomes enabled. Once the thread priority boost function of TPCSM 305 becomes enabled at decision block 515, fetcher 315 or TPCSM 305 chooses or selects a next thread to fetch, as per block 522. TPCSM 305 and instruction fetcher 315 may cooperate to select the next thread for which to fetch instructions. For discussion purposes, assume that the selected instruction is a particular branch instruction in a thread.

The fetcher 315 checks to determine if the next thread for fetch includes a branch instruction that requires a redirect, as per decision block 570. After initialization, the first time through the loop that decision block 570 and blocks 522, 575, 580, 585 and 590 form, there is no redirect. Thus, in that case, fetcher 315 determines a fetch address using branch prediction, as per block 575. Fetcher 315 then accesses the cache memory array 320 to fetch an instruction at the determined fetch address. Process flow continues back to both select next thread block 522 and choose instruction to issue block 525.

Issue unit 330 selects a branch instruction to issue, as per block 525. Issue unit 330 issues the selected branch instruction and retrieves branch information corresponding to the selected branch instruction, as per block 530. Issue unit 330 sends branch issue information to TPCSM 305 as per block 535. The selected branch instruction also executes at this time in BRU 360. The branch issue information may include 1) branch issuance timing information indicating that a branch instruction issued, 2) the thread ID of the instruction thread containing the branch instruction, and 3) confidence information for the branch instruction. BRU 360 checks the branch prediction correct/incorrect status, as per block 540. BRU 360 then distributes the branch prediction correct/incorrect status to fetcher 315, as per block 545. In this manner, fetcher 105 knows whether the branch prediction for a particular branch instruction of a thread was correct.

At the same time that the branch status check of block 540 and the branch status distribution of block 545 occur on the left side of the flowchart, TPCSM 305 performs the functions described in boxes 550, 555, 560 and 565 on the right side of the flowchart. TPCSM 305 checks the branch prediction confidence information in the branch issue information that it receives from issue unit 330. TPCSM 305 conducts a test to determine if the branch prediction information exhibits high confidence, as per decision block 555. More particularly, decision block 555 determines if the branch prediction confidence information for the particular branch instruction exhibits a confidence level that exceeds a predetermined confidence threshold (i.e. exhibits high confidence).

If the branch prediction information for the particular branch instruction does exhibit high confidence, then a branch redirect is not likely. In this case, TPCSM 305 instructs fetcher 315 to schedule a thread without altering the priority of the thread including the particular branch instruction in response to the branch issue information, as per block 560. In other words, fetcher 315 performs normal thread scheduling. However, if the branch prediction information for the particular branch instruction does not exhibit high confidence, then a branch redirect is likely. In this case, TPCSM 305 increases or boosts the priority of the thread including the particular branch instruction. In response to TPCSM 305 increasing the priority of the thread including the particular branch instruction, fetcher 315 schedules this thread for fetch in the next processor cycle rather than waiting until later as would otherwise occur if TPCSM 305 did not boost the priority of the thread. In this manner, in the event of a branch mispredict, the thread including the branch instruction resulting in the mispredict will get faster access to memory array 320.

The flowchart of FIG. 5 shows a dashed rectangle 562 to indicate that blocks 540, 545, 550, 555, 560 and 565 are separated in time from blocks 525, 530 and 535 of dashed rectangle 523. More specifically, while BRU 360 checks branch prediction status in block 540 and distributes that branch prediction status in block 545, TPCSM 305 checks confidence information in blocks 555, 560 and affects the scheduling of the thread including the branch instruction in blocks 560, 565. Processor 300 thus conducts blocks 540, 545 in parallel or substantially simultaneously in time with blocks 550, 555, 560 and 565, in one embodiment. The flowchart of FIG. 5 also shows a dashed rectangle 592 around fetch operational blocks 570, 575, 580, 585 and 590. These fetch operational blocks transpire in approximately the same time domain as the TPCSM operational block 550, 555, 560 and 565 of dashed rectangle 562.

After increasing or boosting thread priority in block 565 or leaving thread priority unchanged in block 560, the select next thread for fetch block 522 receives confidence information. In block 522, TPCSM 305 selects, or the fetcher 315 selects, or TPCSM 305 and fetcher 315 cooperatively select the next thread for which to fetch instructions. In decision block 570, fetcher 315 performs a test to determine if processor 300 should process a redirect in response to a branch misprediction that BRU 360 detected during block 545. If fetcher 315 finds no pending redirect at decision block 570 (i.e. the branch prediction was correct for the particular branch instruction), then fetcher 315 determines the fetch address using branch prediction and sequential next line address prediction techniques. Using this fetch address, fetcher 315 accesses memory array 320, as per block 580. Process flow then continues back to select another thread to fetch for the instruction fetcher block 522, and the instruction flows to issue block 525 at which the process continues. However, if fetcher 315 finds that a redirect is pending (i.e. the branch prediction was incorrect for the particular branch instruction), then a branch redirect occurs. In the event of such a branch redirect, fetcher 315 determines the fetch address via the already scheduled thread for which block 565 previously boosted thread priority, as per block 585. Using this fetch address, fetcher 315 accesses memory array 320, as per block 590. Process flow then continues back to select another thread to fetch for the instruction fetcher 315 at block 522, and the fetched instruction flows to block 525 as the process continues.

Figure 6:
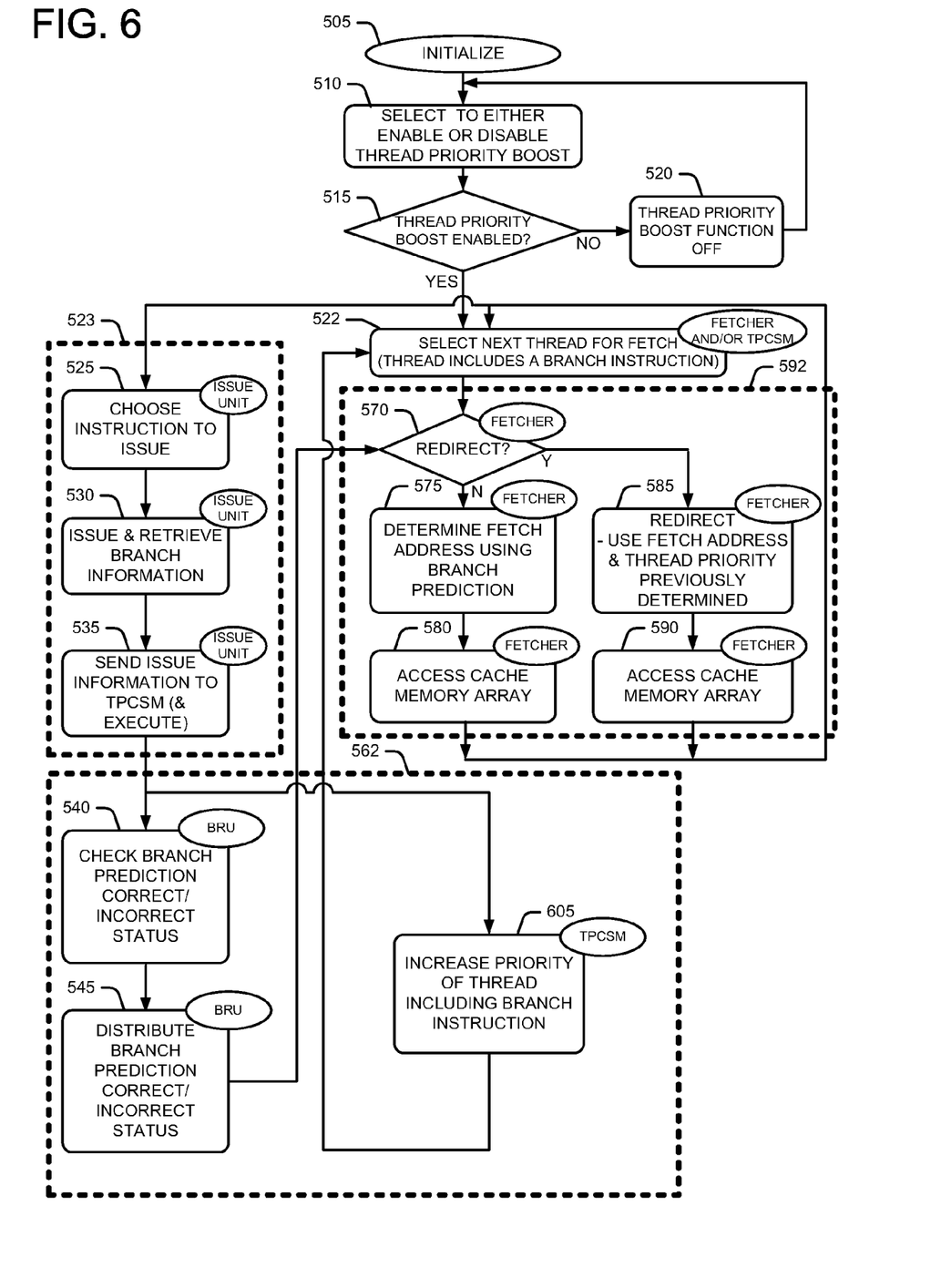
FIG. 6 is a flowchart that depicts an alternative embodiment of the methodology that the processor of FIG. 3 employs.

FIG. 6 is a flowchart that depicts an alternative embodiment of the methodology that the disclosed processor 300 may employ. The flowchart of FIG. 6 includes many steps in common with the steps of the flowchart of FIG. 5. When comparing the flowchart of FIG. 6 with the flowchart of FIG. 5, like numbers indicate like steps. The flowchart of FIG. 6 is similar to the flowchart of FIG. 5, except that the flowchart of FIG. 5 eliminates steps or blocks 550, 555, 560 and 565. Instead of blocks 550, 555, 560 and 565 which cooperate to increase the priority of a thread including a particular branch instruction that exhibits low prediction confidence, block 605 of the flowchart of FIG. 6 increases the priority of all threads including a particular branch instruction. In this manner, a modified TPCSM 305 forces fetcher 315 to be ready to perform a memory array access for that thread whether not the processor ultimately needs such a memory array access.

Figure 7:
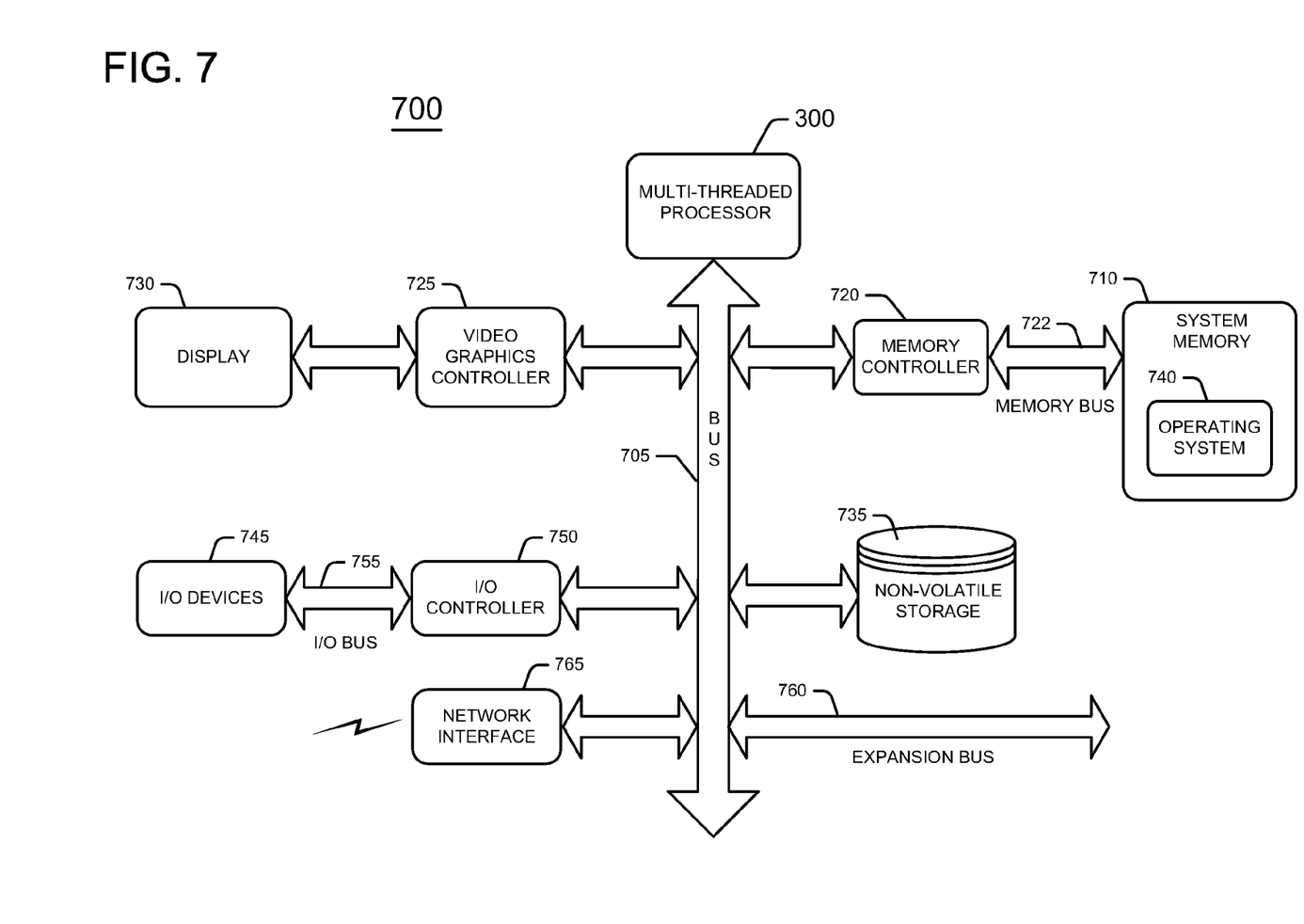
FIG. 7 is block diagram of an information handling system (IHS) that employs the processor of FIG. 3 and the methodology of FIG. 5.

FIG. 7 shows an information handling system (IHS) 700 that employs multi-threaded processor 300. An IHS is a system that processes, transfers, communicates, modifies, stores or otherwise handles information in digital form, analog form or other form. IHS 700 includes a bus 705 that couples processor 300 to system memory 710 via a memory controller 720 and memory bus 722. A video graphics controller 725 couples display 730 to bus 705. Nonvolatile storage 735, such as a hard disk drive, CD drive, DVD drive, or other nonvolatile storage couples to bus 705 to provide IHS 700 with permanent storage of information. An operating system 740 loads in memory 710 to govern the operation of IHS 700. I/O devices 745, such as a keyboard and a mouse pointing device, couple to bus 705 via I/O controller 750 and I/O bus 755. One or more expansion busses 760, such as USB, IEEE 1394 bus, ATA, SATA, PCI, PCIE and other busses, couple to bus 705 to facilitate the connection of peripherals and devices to IHS 700. A network adapter 765 couples to bus 705 to enable IHS 700 to connect by wire or wirelessly to a network and other information handling systems. While FIG. 7 shows one IHS that employs processor 300, the IHS may take many forms. For example, IHS 700 may take the form of a desktop, server, portable, laptop, notebook, or other form factor computer or data processing system. IHS 700 may take other form factors such as a gaming device, a personal digital assistant (PDA), a portable telephone device, a communication device or other devices that include a processor and memory.

There are a number of different ways to modify thread priority consistent with the teachings herein. For example, processor 300 may boost or increase the actual priority of the thread including the particular branch instruction. Alternatively, processor 300 may override an allocation of fetch cycles with respect to a specific cycle that the fetcher and thread priority controller allocate (i.e. override a few cycles). In yet another approach, the fetcher and thread priority controller may effectively modify thread priority by changing the ordering of thread assignments, namely by modifying the order in which the processor 300 services the threads.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of operating a processor, the method comprising:
    storing, by a memory array, a plurality of instruction threads;
    fetching, by a fetcher, a particular instruction thread from the memory array, the particular instruction thread including a particular branch instruction, the fetcher communicating with a thread priority controller;
    predicting, by a branch predictor, an outcome of the particular branch instruction of the particular instruction thread, thus providing a branch prediction;
    issuing, by an issue unit, the particular branch instruction of the particular instruction thread to a branch execution unit for execution and, while performing such issuing, sending by the issue unit branch issue information to the thread priority controller, the branch issue information including branch confidence information, branch issuance timing information and a thread ID of the particular branch instruction;
    changing, by the thread priority controller, a priority of the particular instruction thread in response to the branch issue information, wherein the thread priority controller speculatively increases the priority of the particular instruction thread that includes the particular branch instruction if the branch confidence information indicates low confidence in a predicted outcome of the particular branch instruction in the particular instruction thread, the particular branch instruction thus being a low confidence branch for which a branch redirect is likely;
    executing, by a branch unit, the particular branch instruction;
    sending, by the branch unit, branch prediction correct/incorrect status information to the fetcher; and
    determining by the fetcher, in the event that the branch prediction correct/incorrect status information indicates a branch mispredict, a next fetch address using the branch issue information that the thread priority controller received earlier when the issue unit sent the branch issue information to the thread priority controller.

2. The method of claim 1, wherein the branch confidence information indicates low confidence in the predicted outcome of the particular branch instruction when the branch confidence information exhibits a confidence level not exceeding a predetermined threshold confidence level.

3. The method of claim 1, further comprising scheduling the particular instruction thread for access to the memory array should a redirect occur when the branch execution unit resolves the particular branch instruction.

4. A processor comprising:
    a memory array that stores instruction threads that include branch instructions;
    a fetcher, coupled to the memory array, that fetches a particular instruction thread including a particular branch instruction from the memory array;
    a branch predictor that predicts an outcome of the particular branch instruction, thus providing a branch prediction for the particular branch instruction; and
    an issue unit, coupled to the memory array and a branch execution unit, that issues the particular branch instruction of the particular instruction thread to the branch execution unit for execution, wherein the issue unit while performing such issuing sends branch issue information related to the particular branch instruction to a thread priority controller, the branch issue information including branch confidence information, branch issuance timing information and a thread ID of the particular branch instruction;
    wherein the thread priority controller is coupled to the issue unit and the memory array to receive the branch issue information from the issue unit, wherein the thread priority controller changes a priority of the particular instruction thread in response to the branch issue information relating to the particular branch instruction, wherein the thread priority controller speculatively increases the priority of the particular instruction thread that includes the particular branch instruction if the branch confidence information indicates low confidence in a predicted outcome of the particular branch instruction in the particular instruction thread, the particular branch instruction thus being a low confidence branch for which a branch redirect is likely;
    wherein the branch execution unit executes the particular branch instruction and sends branch prediction correct/incorrect status information to the fetcher such that the fetcher determines, in the event that the branch prediction correct/incorrect status information indicates a branch mispredict, a next fetch address using the branch issue information that the thread priority controller received earlier when the issue unit sent the branch issue information to the thread priority controller.

5. The processor of claim 4, wherein the branch confidence information indicates low confidence in the predicted outcome of the particular branch instruction when the branch confidence information exhibits a confidence level not exceeding a predetermined threshold confidence level.

6. The processor of claim 4, wherein the thread priority controller instructs the fetcher to schedule the particular instruction thread for access to the memory array should a redirect occur when the branch execution unit resolves the particular branch instruction.

7. An information handling system (IHS) comprising:
    a system memory;
    a processor coupled to the system memory, the processor including:
        a memory array that stores instruction threads that include branch instructions;
        a fetcher, coupled to the memory array, that fetches a particular instruction thread including a particular branch instruction from the memory array;

a branch predictor that predicts an outcome of the particular branch instruction, thus providing a branch prediction for the particular branch instruction;

an issue unit, coupled to the memory array and a branch execution unit, that issues the particular branch instruction of the particular instruction thread to the branch execution unit for execution, wherein the issue unit while performing such issuing sends branch issue information related to the particular branch instruction to a thread priority controller, the branch issue information including branch confidence information, branch issuance timing information and a thread ID of the particular branch instruction;

wherein the thread priority controller is coupled to the issue unit and the memory array to receive the branch issue information from the issue unit, wherein the thread priority controller changes a priority of the particular instruction thread in response to the branch issue information relating to the particular branch instruction, wherein the thread priority controller speculatively increases the priority of the particular instruction thread that includes the particular branch instruction if the branch confidence information indicates low confidence in a predicted outcome of the particular branch instruction in the particular instruction thread, the particular branch instruction thus being a low confidence branch for which a branch redirect is likely;

wherein the branch execution unit executes the particular branch instruction and sends branch prediction correct/incorrect status information to the fetcher such that the fetcher determines, in the event that the branch prediction correct/incorrect status information indicates a branch mispredict, a next fetch address using the branch issue information that the thread priority controller received earlier when the issue unit sent the branch issue information to the thread priority controller.

8. The IHS of claim 7, wherein the branch confidence information indicates low confidence in the predicted outcome of the particular branch instruction when the branch confidence information exhibits a confidence level not exceeding a predetermined threshold confidence level.

9. The IHS of claim 7, wherein the thread priority controller instructs the fetcher to schedule the particular instruction thread for access to the memory array should a redirect occur when the branch unit execution unit resolves the particular branch instruction.

* * * * *